United States Patent [19]
Takeshima

[11] Patent Number: 5,209,061
[45] Date of Patent: May 11, 1993

[54] EXHAUST GAS PURIFICATION SYSTEM FOR AN INTERNAL COMBUSTION ENGINE

[75] Inventor: Shinichi Takeshima, Susono, Japan
[73] Assignee: Toyota Jidosha Kabushiki Kaisha, Toyota, Japan
[21] Appl. No.: 848,386
[22] Filed: Mar. 9, 1992

[30] Foreign Application Priority Data

Mar. 13, 1991 [JP] Japan ............................ 3-72057

[51] Int. Cl.$^5$ ..................... F01N 3/20; F02M 25/06
[52] U.S. Cl. ....................................... 60/278; 60/284; 60/285; 60/286
[58] Field of Search .............. 60/278, 285, 284, 301, 60/286

[56] References Cited

U.S. PATENT DOCUMENTS

| | | | |
|---|---|---|---|
| 3,827,238 | 8/1974 | Hayashi . | |
| 3,908,371 | 9/1975 | Nagai | 60/286 |
| 3,927,523 | 12/1975 | Shioyama | 60/284 |
| 4,165,610 | 8/1979 | Iizuka | 60/284 |
| 4,297,328 | 10/1981 | Ritscher | 60/301 |
| 4,403,473 | 9/1983 | Gladden | 60/286 |
| 4,452,040 | 6/1984 | Kobashi | 60/274 |
| 4,574,588 | 3/1986 | Hayama | 60/284 |
| 4,946,659 | 8/1990 | Held | 423/212 |
| 5,050,551 | 9/1991 | Morikawa | 60/285 |

FOREIGN PATENT DOCUMENTS

| | | |
|---|---|---|
| 0441401 | 8/1991 | European Pat. Off. . |
| 63-283727 | 11/1988 | Japan . |
| 3-054343 | 8/1991 | Japan . |

Primary Examiner—Douglas Hart
Attorney, Agent, or Firm—Kenyon & Kenyon

[57] ABSTRACT

An exhaust gas purification system includes a lean burn engine having an exhaust conduit, a lean NOx catalyst installed in the exhaust conduit, an HC amount increasing device capable of increasing an amount of HC included in exhaust gas flowing to the lean NOx catalyst, a catalyst temperature determining device for determining a catalyst temperature and determining whether the catalyst temperature is below a predetermined value, and an HC amount increasing device operating device capable of intermittently operating the HC amount increasing device when the catalyst temperature is below the predetermined value. The HC increased at low catalyst temperatures is partially oxidized to generate a large amount of radicals which are held within small cells of the lean NOx catalyst. When the catalyst temperature rises, the radicals held in the cells are effectively used to reduce NOx until the radicals are compensated.

11 Claims, 3 Drawing Sheets

EXHAUST GAS PURIFICATION SYSTEM FOR AN INTERNAL COMBUSTION ENGINE

BACKGROUND OF THE INVENTION

1. Field of the Invention

The present invention relates to an exhaust gas purification system for an internal combustion engine which includes a so-called lean NOx catalyst in an exhaust conduit of the engine.

2. Description of the Prior Art

Japanese Patent Publication Nos. HEI 1-130735 and HEI 1-135541 disclose an NOx catalyst constructed of zeolite carrying a metal selected from the group consisting of transition metals and noble metals and capable of reducing nitrogen oxides (NOx) under oxidizing gas conditions in the presence of hydrocarbons (HC). Such catalyst will be called a lean NOx catalyst hereinafter. The lean NOx catalyst needs HC to reduce NOx. Japanese Patent Publication No. SHO 63-283727 discloses a system wherein an HC supply apparatus is provided and HC is continuously supplied from the HC supply apparatus to a lean NOx catalyst when HC included in engine exhaust gas is insufficient, for example, when the exhaust gas temperature is high and the HC included in engine exhaust gas is directly oxidized into $CO_2$ and $H_2O$.

However, there are problems with the prior art systems. More particularly, even if HC is supplied when the exhaust gas temperature is high, almost all of the supplied HC is directly oxidized into $CO_2$ and $H_2O$ and cannot be effectively used for reducing NOx. As a result, the NOx reduction rate of the lean NOx catalyst will not be increased as much as expected.

Further, if HC is continuously supplied, the merit (good fuel economy) of a lean burn engine will be lost. Furthermore, such continuous supply of HC will increase heat generation due to oxidation of HC at the lean NOx catalyst to raise the catalyst temperature. As a result, the lean NOx catalyst will be thermally degraded.

SUMMARY OF THE INVENTION

An object of the present invention is to provide an exhaust gas purification system for an internal combustion engine having a lean NOx catalyst in an exhaust conduit of the engine wherein HC is supplied to increase an NOx purification rate of the lean NOx catalyst and the supplied HC can be effectively used for increasing the NOx purification rate of the lean NOx catalyst.

The above-described object can be attained by an exhaust gas purification system for an internal combustion engine in accordance with the present invention which includes: an internal combustion engine capable of fuel combustion at lean air-fuel ratios and having an exhaust conduit; a lean NOx catalyst installed in the exhaust conduit of the engine; HC amount increasing means capable of increasing an amount of HC included in exhaust gas flowing to the lean NOx catalyst; catalyst temperature determining means for determining a temperature representing a lean NOx catalyst temperature and determining whether the lean NOx catalyst temperature is below a predetermined value; and HC amount increasing means operating means for operating the HC amount increasing means intermittently when the catalyst temperature determining means determines that the lean NOx catalyst temperature is below the predetermined value.

In the above-described exhaust gas purification system for an internal combustion engine in accordance with the present invention, when the exhaust gas temperature is low, the HC amount increasing means operating means operates the HC amount increasing means so that the amount of HC included in exhaust gas flowing to the lean NOx catalyst is increased.

When the exhaust gas temperature is relatively low, direct oxidation of the HC is suppressed and partial oxidation of the HC is promoted to generate a relatively large amount of radicals (active species). The radicals will be held within cells of the lean NOx catalyst for a plurality of minutes. Since the HC amount increasing means is intermittently operated so as to increase the HC amount, a relatively large amount of HC will be continuously held within the many cells of the lean NOx catalyst. Then, when the lean NOx temperature rises and the HC amount is insufficient, the HC held within the cells is effectively used for reduction of NOx till all of the held HC is compensated, so that a high NOx purification rate (NOx conversion) of the lean NOx catalyst is obtained.

Further, the lean NOx catalyst has a characteristic that it can show a higher NOx purification rate in a rising temperature period of time than in a falling temperature period of time or in a constant temperature period of time. Therefore, since the HC held within the catalyst cells is effectively used in the rising temperature period of time, the NOx purification rate of the lean NOx catalyst will be further improved.

Furthermore, since the HC amount increasing means operating means operates the HC amount increasing means not continuously but intermittently, increase in HC emissions and thermal degradation of the lean NOx catalyst will be effectively suppressed as compared with the conventional case where HC was continuously supplied.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENTS

Figure 2:
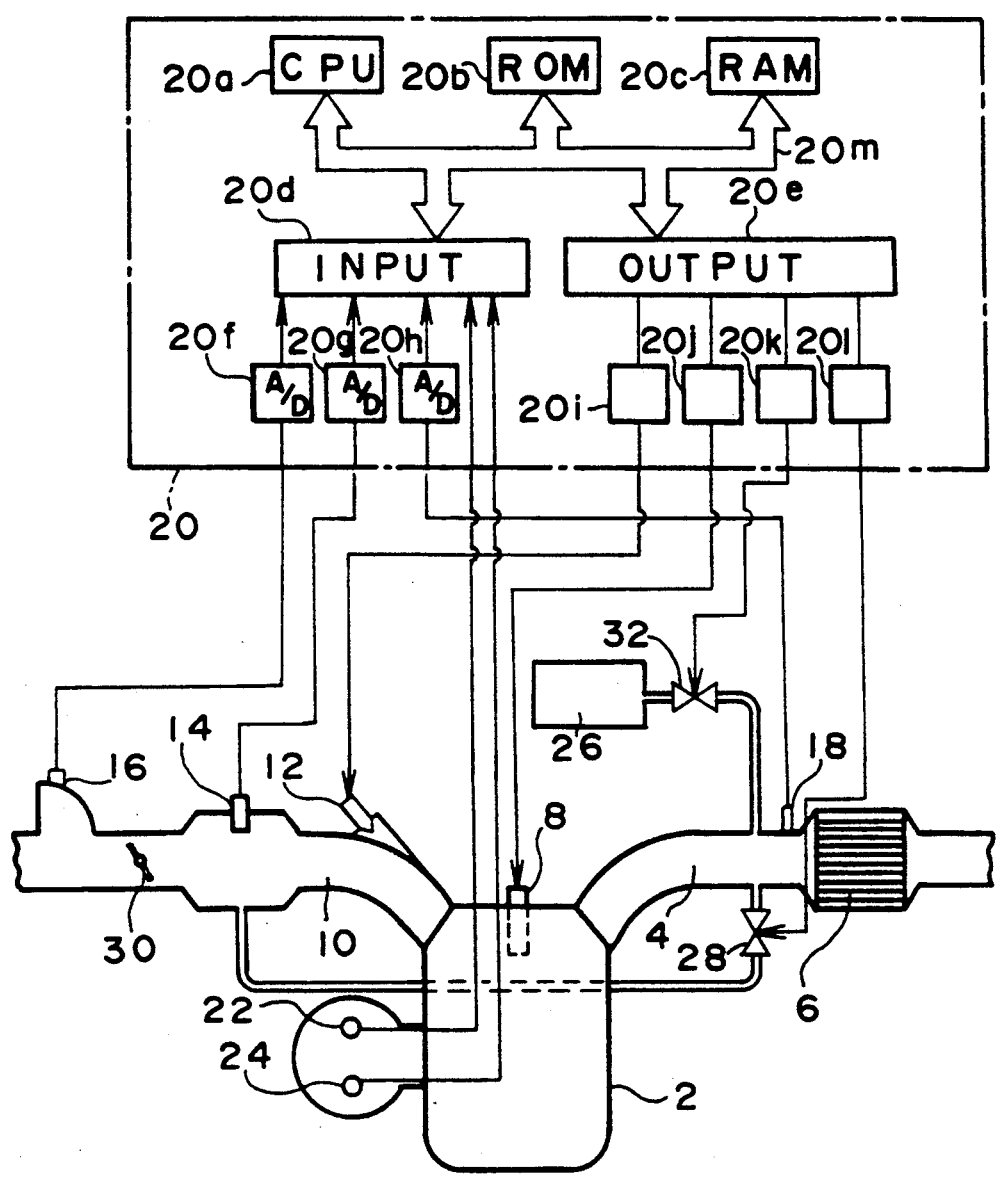
FIG. 2 is a schematic system diagram of the exhaust gas purification system for an internal combustion engine provided with the embodiment of the present invention.

As illustrated in FIG. 2, an exhaust gas purification system in accordance with an embodiment of the invention includes an internal combustion engine 2 capable of fuel combustion at lean air-fuel ratios (that is, a lean burn engine, including a diesel engine). The engine 2 has an exhaust conduit 4 where a lean NOx catalyst 6 is installed. In this instance, the lean NOx catalyst is defined as a catalyst constructed of zeolite carrying a metal selected from the group consisting of transition metals and noble metals and capable of reducing NOx under oxidizing gas conditions (lean air-fuel gas conditions) in the presence of HC.

The exhaust gas purification system further includes an HC amount increasing means capable of increasing an amount of HC included in exhaust gas flowing to the lean NOx catalyst 6.

Such HC amount increasing means may include an HC source 26 and an HC control valve 32 for switching supply of HC from the HC source between ON and OFF. The HC source 26 may be an HC bomb or a tank of engine fuel.

The HC amount increasing means may include an ignition plug 8 and ignition timing control means. When the ignition timing control means advances the ignition timing, the amount of HC included in the exhaust gas will be increased.

The HC amount increasing means may include a fuel injection valve installed in an intake conduit 10 of the engine and fuel injection timing control means. When the fuel injection timing is offset from an optimum fuel injection timing, unburned fuel will be increased to increase the amount of HC included in the exhaust gas.

The HC amount increasing means may include an exhaust gas recirculation system (EGR) having an EGR valve 28. When the EGR valve 28 is opened to lead a portion of the exhaust gas to the intake conduit 10 of the engine, combustion is partially degraded to increase the amount of unburned fuel and the amount of HC included in the exhaust gas.

For the purpose of detecting various engine operating conditions to control the HC amount increasing means, various sensors are provided. More particularly, an intake pressure sensor 14 and an intake air amount detecting sensor (for example, air flow meter) 16 are installed in the intake conduit 10 of the engine, and an exhaust gas temperature detecting sensor 18 is installed in the exhaust conduit 4 of the engine. Further, a crank angle sensor 22 and a reference crank angle sensor 24 are housed in a distributor operatively coupled to an engine crankshaft. Outputs of these sensors 14, 16, 18, 22 and 24 are fed to an electronic control unit (ECU) 20, and the fuel injection valve 12, the ignition plug 8, the EGR valve 28, and the HC control valve 32 are controlled in accordance with the instructions from the ECU 20.

The ECU 20 is constituted by a micro computer. The ECU 20 includes analog/digital converters 20f, 20g and 20h for converting analog signals to digital signals, an input interface 20d for receiving input signals, a central processor unit (CPU) 20a for conducting calculations, a read-only memory (ROM) 20b, a random access memory (RAM) 20c for temporarily storing data, an output interface 20e for sending instruction signals therethrough, drive circuits 20i, 20j, 20k and 20l for changing instruction signals to drive signals, and a connecting path 20m for electrically connecting these computer portions.

Figure 1:
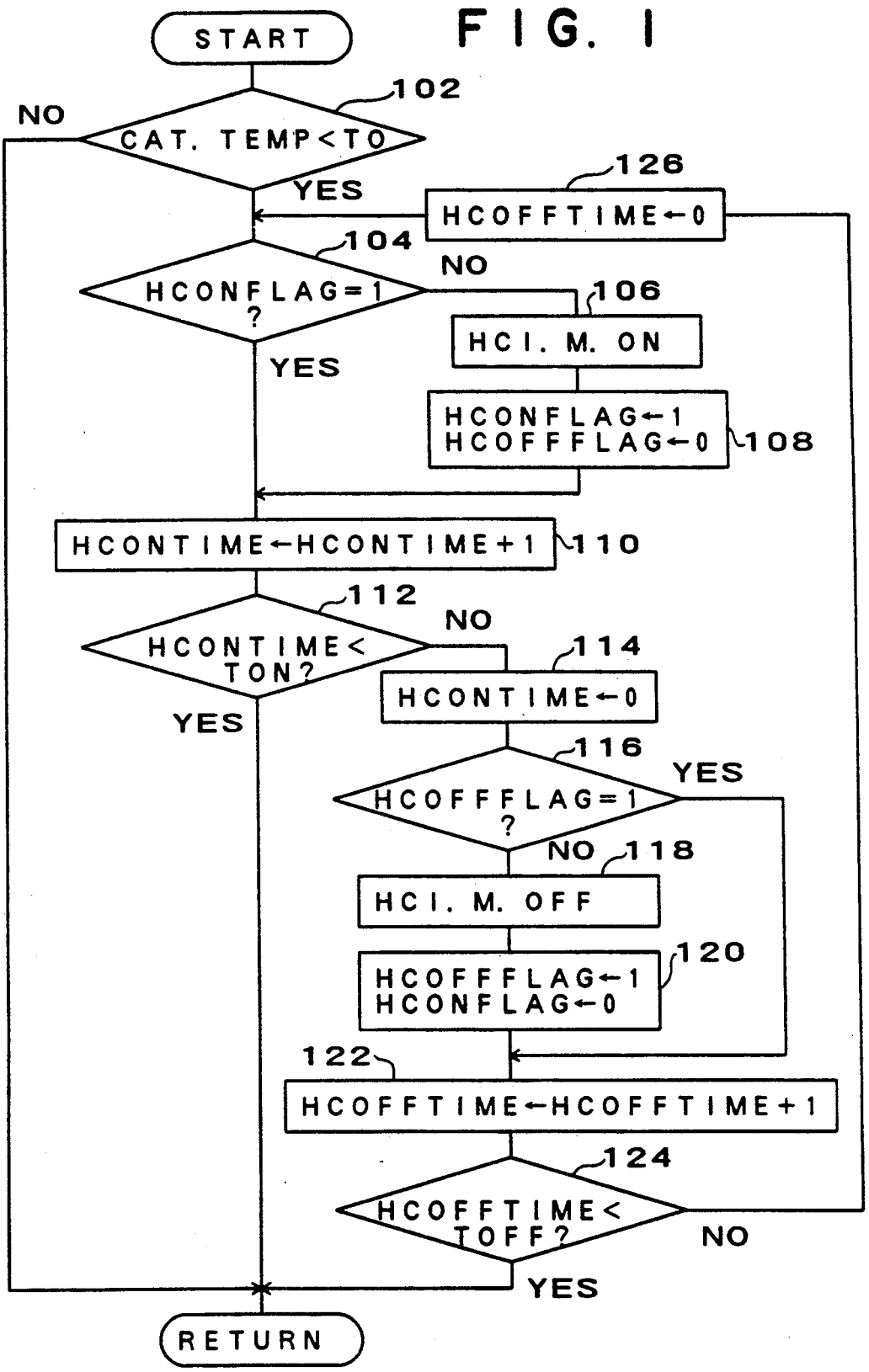
FIG. 1 is a flow chart of an HC amount increasing control routine of an exhaust gas purification system for an internal combustion engine in accordance with an embodiment of the present invention.

A control routine for controlling operation of the HC amount increasing means, for example a routine shown in FIG. 1, is stored in the ROM 20b and called by the CPU 20a where calculation in accordance with the routine is conducted.

The control routine of FIG. 1 is entered at intervals of predetermined periods of time or at intervals of predetermined crank angles. In the case where the routine is entered at intervals of predetermined crank angles, the outputs of the reference crank angle sensor 24 can be used for reference signals of the predetermined crank angles.

In the routine of FIG. 1, at step 102, a determination is made as to whether or not a catalyst temperature of the lean NOx catalyst 6 is lower than a predetermined temperature, for example 400° C. The reason why HC control is conducted only at temperatures lower than the predetermined temperature is that, at high temperatures higher than the predetermined temperature, direct oxidation of HC into $CO_2$ and $H_2O$ is promoted and therefore it is difficult to generate radicals due to partial oxidation of HC and to smoothly hold the radicals in the cells of the catalyst. The step 102 constitutes part of the catalyst temperature determining means for determining a temperature representing the lean NOx catalyst temperature and determining whether the lean NOx catalyst temperature is below the predetermined temperature.

The lean NOx catalyst temperature may be determined on the basis of an engine load Q/N (calculated from an intake air amount Q determined by the intake air amount detecting sensor 16 and engine rotational number N from the output of the crank angle sensor 22) and an engine rotational speed NE (calculated from the engine rotational number N and time) using a predetermined exhaust gas temperature versus engine operating condition map which experimentarily determines exhaust gas temperatures corresponding to engine operating conditions (engine loads and engine speeds). Alternatively, the lean NOx catalyst temperature may be determined on the basis of the outputs of the exhaust gas temperature detecting sensor 18.

Further, since the catalyst or exhaust gas temperature falls at the time of fuel cutting in deceleration and at the time of idling, the lean NOx catalyst temperature can be deemed to be lower than the predetermined temperature when the fuel injection period of time in a fuel injection timing calculation is found to be zero or when an opening degree of a throttle valve 30 is found to be smaller than a predetermined throttle valve opening degree.

If it is determined at step 102 that the lean NOx catalyst temperature is equal to or higher than the predetermined temperature, the routine proceeds directly to a returning step, and only when the lean NOx catalyst temperature is determined to be lower than the predetermined temperature at step 102 does the routine proceed to steps 104–126. In this instance, the steps 104–126 constitute HC amount increasing means operating means for operating the HC amount increasing means intermittently when the catalyst temperature determining means determines that the lean NOx catalyst temperature is below the predetermined temperature. More particularly, the steps 104–126 includes steps 104–114 for holding the HC amount increasing means in an ON state for a first predetermined time period and steps 116–126 for holding the HC amount increasing means in an OFF state for a second predetermined time period.

More particularly, at step 104, a determination is made as to whether or not flag HCONFLAG, which is a flag for indicating ON of the HC amount increasing means, is "1". In this instance, "1" of the flag corresponds to ON of the HC amount increasing means. If HCONFLAG is "0" at step 104, that is, the HC amount increasing means is not in an ON state up to that time, the routine proceeds to step 106, where the HC amount increasing means is switched to ON to begin to increase an HC amount. Then, the routine proceeds to step 108, where flag HCONFLAG is set to "1" and flag HCOFFFLAG is set to "0". In this instance, HCOFF-FLAG is a flag for indicating OFF of the HC amount increasing means and "1" of HCOFFFLAG corresponds to a stop of increase in the HC amount. If HCONFLAG is "1" at step 104, the HC increasing state should be maintained and therefore the routine proceeds to step 110, skipping steps 106 and 108.

At step 110, counter HCONTIME for counting the HC increasing state holding time period is increased by one per entrance to the routine. The counter constitutes a kind of timer.

Figure 3:
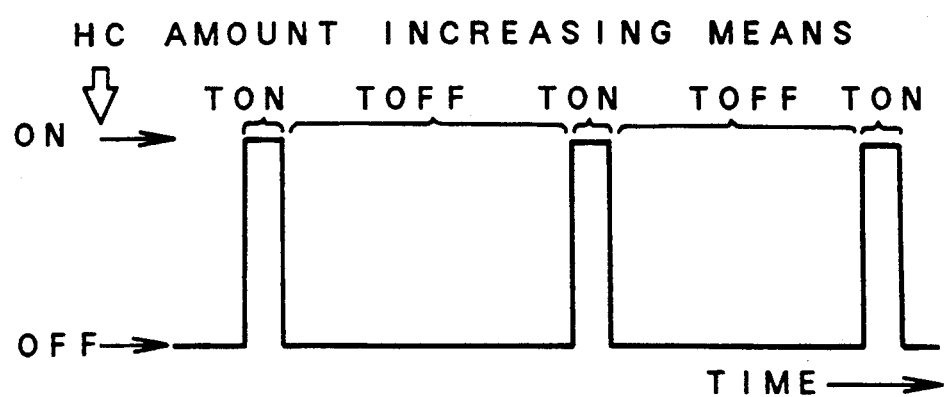
FIG. 3 is a chart illustrating ON and OFF operation of the HC amount increasing means of the exhaust gas purification system for an internal combustion engine in accordance with the embodiment of the present invention.

Then, at step 112, a determination is made as to whether or not the counted-up time HCONTIME exceeds a predetermined time period TON (see FIG. 3) during which the HC amount increasing means should be held ON.

If HCONTIME is less than TON at step 112, the state of ON may be held further and the routine returns. In contrast, if HCONTIME is equal to or greater than TON at step 112, the routine proceeds to step 116 where the HC amount increasing means is switched to OFF so that the OFF state is held for a time period TOFF. In this instance, before the routine proceeds to step 116, HCONTIME should be cleared to "0" at step 114.

At step 116, a determination is made as to whether or not flag HCOFFFLAG, which is a flag for indicating OFF of the HC amount increasing means, is "1". In this instance, "1" of the flag corresponds to OFF of the HC amount increasing means. If HCOFFFLAG is "0" at step 116, that is, the HC amount increasing means is in an ON state up to that time, the routine proceeds to step 118, where the HC amount increasing means is switched to OFF to stop increase in an HC amount. Then, the routine proceeds to step 120, where flag HCOFFFLAG is set to "1" and flag HCONFLAG is set to "0". If HCOFFFLAG is "1" at step 116, the HC increase stopping state should be maintained and therefore the routine proceeds to step 122, skipping steps 118 and 120.

At step 122, counter HCOFFTIME for counting the HC increase stopping state holding time period is increased by one per entrance to the routine. The counter constitutes a kind of timer.

Then, at step 124, a determination is made as to whether or not the counted-up time HCOFFTIME exceeds a predetermined time period TOFF (see FIG. 3) during which the HC amount increasing means should be held OFF.

If HCOFFTIME is less than TOFF at step 124, the state of OFF may be held further and the routine returns. In contrast, if HCOFFTIME is equal to or greater than TOFF at step 124, the routine proceeds to step 104 so that the HC amount increasing means is switched to ON and to restart increase in the HC amount. In this instance, before the routine proceeds to step 104, HCOFFTIME should be cleared to "0" at step 126.

Due to the control of FIG. 1, the HC amount increasing means operating means (including steps 102–126) operates the HC amount increasing means so that a combination of the ON state for the TON time period and the OFF state for the TOFF time period is repeated at low catalyst temperatures until the catalyst temperature finally rises to the predetermined temperature. As a result, the HC amount increasing means is operated intermittently.

Operation of the above-described exhaust gas purification system for an internal combustion engine will now be explained.

Figure 4:
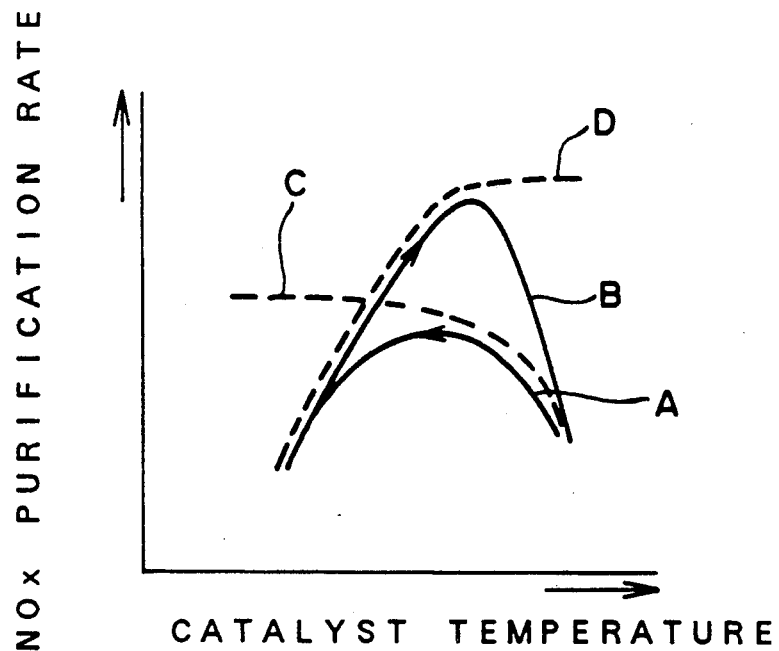
FIG. 4 is a graphical representation of an NOx purification rate versus catalyst temperature characteristic of a lean NOx catalyst.

The lean NOx catalyst 6 has an NOx purification characteristic A as shown in FIG. 4. At high temperatures (for example, above 550° C.), HC included in the exhaust gas is directly oxidized and therefore generation of radicals due to partial oxidation of HC is suppressed. As a result, the NOx purification rate is decreased at high temperatures (see characteristic C of FIG. 4). In contrast, at low temperatures (for example, below 350° C.), the activity of catalyst itself is lost, so that the NOx purification rate of the lean NOx catalyst is decreased (see characteristic D of FIG. 4). Therefore, the lean NOx catalyst 6 can show a high NOx purification rate only in a certain temperature range (for example, 350° C.–550° C.).

In the prior art control for the NOx purification rate of the lean NOx catalyst, either an amount of continuously supplied HC is increased at high temperatures or a catalyst temperature is controlled to be brought into the high NOx purification rate temperature range. Therefore, an NOx purification system like the present invention, where HC is increased at low temperatures to generate a large amount of radicals and to hold the radicals in cells of the catalyst and the held radicals are effectively used at high temperatures, cannot be seen in the prior art.

In contrast, in the present invention, the current catalyst temperature is determined by the catalyst temperature determining means 102, and the HC amount increasing means (for example, 26 and 32) is intermittently operated by the HC amount increasing means operating means 104–126 at low catalyst temperatures to increase the HC amount in the exhaust gas. The increased HC is partially oxidized at the lean NOx catalyst 6 to generate radicals which are held in the numerous cells (having diameters of about 5 angstroms) of the lean NOx catalyst to stay in the cells for several minutes. The HC amount increasing means is controlled by the HC amount increasing means operating means so that the HC amount increasing means is in operation for the TON time period (for example, three minutes), then operation of the HC amount increasing means is stopped for the TOFF time period (for example, one minute), and the ON and OFF are repeated. Therefore, a large amount of radicals will be substantially continuously held in the cells of the lean NOx catalyst 6.

Then, when the lean NOx catalyst temperature rises to the high NOx purification rate temperature range, the radicals held in the cells effectively react with NOx to reduce the NOx. As a result, the NOx purification rate of the lean NOx catalyst rises transiently for several minutes until substantially all the radicals held in the cells are compensated.

In addition, as shown in FIG. 4, the NOx purification rate D at the time of rising catalyst temperature is higher than those at the time of constant catalyst temperature and at the time of falling catalyst temperature. Since the radicals held in the cells are used under rising catalyst temperature conditions, the NOx purification rate of the lean NOx catalyst 6 will be increased even further.

Moreover, since deceleration and idling conditions will occur repeatedly in actual car operations at low catalyst temperatures, the above-described transient NOx purification rate increases are obtained in every temperature rise after a deceleration or idling condition. As a result, the NOx purification rate of the lean NOx catalyst 6 will be raised.

In accordance with the present invention, the following advantages will be obtained.

First, since the HC amount increasing means and the HC amount increasing means operating means are provided and the HC amount increasing means operates intermittently during low catalyst temperature conditions, a large amount of radicals generated due to the HC amount increase are held within the catalyst cells and the NOx purification rate of the lean NOx catalyst can be raised for a transient period. Since such low catalyst temperature conditions occur repeatedly in actual car operation, the average NOx purification rate of the lean NOx catalyst normally will be increased to a great extent.

Second, since the HC amount increasing means operating means operates the HC amount increasing means not continuously but intermittently, the NOx purification rate of the lean NOx catalyst can be raised without being accompanied by an increase in HC emissions and thermal degradation of the lean NOx catalyst due to heat generated by HC oxidation. Further, the merit of good fuel economy of the lean burn engine will not be lost.

Third, since the HC amount increasing means is operated at low temperatures, a large portion of the increased HC can be effectively used for reduction of NOx. In this instance, if HC were supplied at high temperatures as in the prior art, almost none of the supplied HC could be effectively used for reduction of NOx.

Although a few embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. An exhaust gas purification system for an internal combustion engine comprising:
    an internal combustion engine capable of fuel combustion at lean air-fuel ratios and having an exhaust conduit;
    an NOx catalyst installed in the exhaust conduit of the engine, the NOx catalyst being constructed of zeolite and carrying a metal selected from the group consisting of transition metals and noble metals;
    HC amount increasing means capable of increasing an amount of HC included in exhaust gas flowing to the NOx catalyst;
    catalyst temperature determining means for determining one of a temperature of the NOx catalyst and a temperature representing the NOx catalyst temperature and determining whether the NOx catalyst temperature is below a predetermined temperature; and
    HC amount increasing means operating means for operating the HC amount increasing means intermittently when the catalyst temperature determining means determines that the NOx catalyst temperature is below said predetermined temperature, wherein the NOx catalyst reduces NOx included in the exhaust gas from the engine in the presence of radicals generated through partial oxidation of HC, a relatively large amount of said radicals being produced in said NOx catalyst, said produced radicals being held within cells of the NOx catalyst at NOx catalyst temperatures which are below the predetermined NOx catalyst temperature and wherein the HC amount increasing means operating means operates to maintain the HC amount increasing means in an ON state for a first predetermined time period and, subsequently, operates to maintain the HC amount increasing means in an OFF state for a second predetermine time.

2. An exhaust gas purification system for an internal combustion engine according to claim 1, wherein the HC amount increasing means includes an HC source and an HC control valve for switching supply of HC from the HC source between ON and OFF.

3. An exhaust gas purification system for an internal combustion engine according to claim 1, wherein the HC amount increasing means includes an ignition plug of the engine; ignition timing control means; and means for advancing a timing of the ignition timing means in response to a determination by the catalyst temperature determining means that the NOx catalyst temperature is below said predetermined value.

4. An exhaust gas purification system for an internal combustion engine according to claim 1, wherein the HC amount increasing means includes a fuel injection valve for the engine; fuel injection timing control means; and means for offsetting a fuel injection timing from an optimum fuel injection timing in response to a determination by the catalyst temperature determining means that the NOx catalyst temperature is below said predetermined value.

5. An exhaust gas purification system for an internal combustion engine according to claim 1, wherein the HC amount increasing means includes an EGR valve of an EGR system for the engine; EGR valve operation control means; and means for actuating the EGR valve operation control means to open the EGR valve in response to a determination by the catalyst temperature determining means that the NOx catalyst temperature is below said predetermined value.

6. An exhaust gas purification system for an internal combustion engine according to claim 1, wherein the predetermined temperature is about 400° C.

7. An exhaust gas purification system for an internal combustion engine according to claim 1, wherein the catalyst temperature determining means includes an exhaust gas temperature detecting sensor.

8. An exhaust gas purification system for an internal combustion engine according to claim 1, wherein the catalyst temperature determining means includes an intake air amount detecting sensor, an engine rotational speed sensor, and a predetermined map for determining an NOx catalyst temperature based on outputs from the intake air amount detecting sensor and the engine rotational speed sensor.

9. An exhaust gas purification system for an internal combustion engine according to claim 1, wherein the catalyst temperature determining sensor includes means for calculating a fuel injection timing for the engine and means for determining that the catalyst temperature is below said predetermined value upon a signal of "zero" for a fuel injection period of time calculated by said means for calculating the fuel injection timing.

10. An exhaust gas purification system for an internal combustion engine according to claim 1, wherein the catalyst temperature determining means includes means for determining whether or not the engine is idling, based on an opening degree of a throttle valve and determining that the catalyst temperature is below said predetermined value when the engine is idling.

11. An exhaust gas purification system for an internal combustion engine 1, wherein the first predetermined time period is three seconds and the second predetermined time period is one minute.

* * * * *

UNITED STATES PATENT AND TRADEMARK OFFICE
CERTIFICATE OF CORRECTION

PATENT NO. : 5,209,061

DATED : May 11, 1993

INVENTOR(S) : Shinichi TAKESHIMA

It is certified that error appears in the above-identified patent and that said Letters Patent is hereby corrected as shown below:

Column 8, line 19, change "predetermine" to --predetermined--.

Signed and Sealed this

Nineteenth Day of April, 1994

Attest:

BRUCE LEHMAN

Attesting Officer

*Commissioner of Patents and Trademarks*